United States Patent
De Girolamo et al.

(10) Patent No.: US 7,054,558 B2
(45) Date of Patent: May 30, 2006

(54) METHOD FOR TRAFFIC PROTECTION IN WDM FIBER OPTIC TRANSPORT NETWORKS

(75) Inventors: Claudio De Girolamo, Corsico (IT); Mariangela Conti, Villa Raverio (IT); Sergio Belotti, Vimercate (IT)

(73) Assignee: Alcatel, Paris (FR)

(*) Notice: Subject to any disclaimer, the term of this patent is extended or adjusted under 35 U.S.C. 154(b) by 865 days.

(21) Appl. No.: 09/771,664

(22) Filed: Jan. 30, 2001

(65) Prior Publication Data

US 2001/0021049 A1    Sep. 13, 2001

(30) Foreign Application Priority Data

Feb. 1, 2000    (IT) .......................... MI2000A0140

(51) Int. Cl.
*H04B 10/20*    (2006.01)

(52) U.S. Cl. .............................. 398/59; 398/79; 398/3; 398/5; 398/7; 398/13; 398/14; 398/17; 398/10; 398/45; 370/224; 370/244; 370/249; 370/222; 370/235

(58) Field of Classification Search .................... 398/3, 398/5, 7, 13, 14, 17, 10, 59, 45, 79, 1, 2, 398/4; 370/224, 244, 249, 222, 235, 223, 370/403, 394, 428
See application file for complete search history.

(56) References Cited

U.S. PATENT DOCUMENTS

| | | | |
|---|---|---|---|
| 6,205,158 B1* | 3/2001 | Martin et al. | 370/541 |
| 6,246,667 B1* | 6/2001 | Ballintine et al. | 370/224 |
| 6,643,041 B1* | 11/2003 | Ikeda et al. | 398/79 |
| 6,735,171 B1* | 5/2004 | Takeguchi | 370/235 |

OTHER PUBLICATIONS

ITU-T G.872 Telecommunications Standardization Sector, Feb. 1999.
ITU-T G.841 International Telecommunication Union, Oct. 1998.

* cited by examiner

*Primary Examiner*—Hanh Phan
(74) *Attorney, Agent, or Firm*—Sughrue Mion, PLLC

(57) ABSTRACT

A method for the protection of fiber optic ring-shaped transport networks, the networks including network elements connected by spans, optical paths being installed between the network elements, the method including the steps of providing each network element with information concerning the network architecture; providing each network element with information concerning configuration data of the network elements; providing each network element with information concerning criteria for triggering the mechanism; establishing an information exchange protocol comprising a set of messages and of rules; establishing a traffic rerouting method, wherein the configuration data include the ring map, the traffic map, the wavelength and the bit rate concerning every path.

7 Claims, 3 Drawing Sheets

METHOD FOR TRAFFIC PROTECTION IN WDM FIBER OPTIC TRANSPORT NETWORKS

BACKGROUND OF THE INVENTION

1. Field of the Invention

The present invention relates to a method for the protection of traffic (voice/data, in general, "information") in WDM-based fiber optic transport networks, namely Optical Transport Networks (OTNs). In particular the method according to the present invention is applicable to ring topology networks.

2. Description of the Prior Art

In current telecommunication networks it has become extremely important to have the capability of automatically restoring faults occurring in the networks themselves without impairing the functionality of the service.

Therefore, the telecommunications networks, and in particular the fiber optic networks, must be provided with protection means against possible failures in network elements. A fault may arise from a fiber break, or from a degrade of the fiber itself or the connector thereof, or from failure in the optical interface or another component of a network element.

At present, no traffic protection mechanism in fiber optic transport networks based on WDM technology is known, wherein such a mechanism operates at Optical Multiplex Section (reference could be made to ITU-T G. 872 draft).

SUMMARY OF THE INVENTION

The main object of the present invention is therefore to provide a traffic protection mechanism for fiber-optic transport networks. This and further objects are achieved by a method characterized by the steps set forth in claim 1 and by a device having the characteristics set forth in claim 5. All the claims are considered as an integral part of the present description.

The method for the protection of a WDM-based ring-topology optical transport network applies to a network comprising network elements joined by spans wherein optical paths are installed. The method comprises the steps of: i) defining a network architecture; ii) defining configuration data of the network elements; iii) defining criteria triggering the protection mechanism; iv) defining a mechanism state machine and a protocol for exchanging information between the network elements, the protocol comprising a set of messages and both the syntax and semantics thereof; v) defining a method for traffic re-routing; and vi) defining a set of operator commands for network maintenance. It is characterized in that said step i) comprises the step of defining a network wherein the whole capacity is evenly splitted between working capacity and protection capacity; said step ii) comprises the steps of providing each network element with a ring network map, a traffic map with path characteristics and bit rate of each path; said step iii) comprises the step of considering as triggering criteria the defects at OMS section level or the network element failures; said step iv) comprises the step of defining as state machine and protocol fundamentally those described in ITU-T G.841; and said step vi) comprises the step of defining as operator commands those described in ITU-T G.841, wherein the terms and concepts which are specific for SDH transmissions are replaced by those corresponding to OTN networks.

The various steps of the method could be performed not only via hardware but also, profitably, via proper computer software program. Therefore the scope of the present invention is held to include such a computer software program code means adapted to perform all the various steps of the method and a computer-readable medium having a program recorded thereon, as well as the computer able to operate such computer software program.

There now follows a detailed description of the invention given by way of a mere non limiting example thereof and to be read with reference to the attached drawing sheets.

BEST MODE FOR CARRYING OUT THE INVENTION

Figure 1:
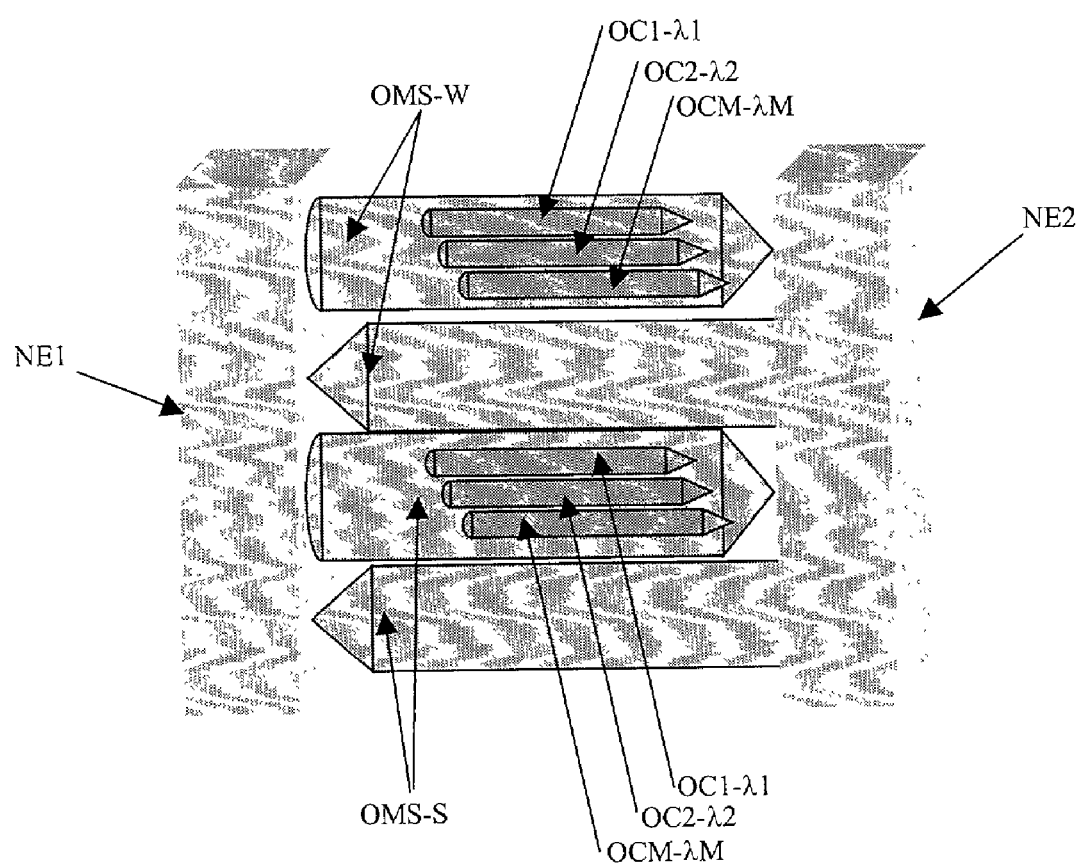
FIG. 1 schematically shows a WDM network span bounded by two network elements.

Before describing in detail the present invention, it is useful to mention some notions relating to protection mechanisms in transmission networks. In MS-SPRING (Multiplex Section Shared Protection Ring) SDH telecommunication networks, for instance, a shared protection mechanism is implemented, which mechanism allows for the automatic traffic restoration should a signal fail or apparatus fail occur.

The MS-SPRING networks perform the automatic traffic restoration by means of a synchronized rerouting of said traffic, which is performed at every ring node if necessary. This operation is controlled by a protocol consisting in messages which are continuously exchanged between the adjacent nodes. Said protocol and the operations that it implies in connection with the various bit patterns are defined by many international Standards, issued by ANSI, ITU-T and ETSI. See, for instance, the ITU-T Recommendation G.841, October 1998 which is considered as incorporated herein for reference. It should be noted that any reference to such a Recommendation which will be done herebelow or in the attached claims automatically covers also the corresponding Recommendations issued by other organizations.

Such a protection technique requires for each network element to be provided, at the inside thereof, with a device, an APS (Automatic Protection Switch) controller. The APS controller, according to the received inputs (signal or apparatus failures which are locally detected, received protocol messages and external commands) evolves and determinate the outputs (protocol messages to be transmitted and traffic protection actions performed through re-routing).

Indeed, the protection in the MS-SPRING is implemented according to a technique termed "Bridge and Switch", that substantially consists in rerouting, through a proper modification of the internal connections of the network elements, the traffic, by transferring it from the working capacity to the protection capacity when the working capacity is not available.

The bridge action substantially causes a node to transmit the same traffic both over the working capacity and over the protection capacity, whereas the switching action corresponds to a selection of the traffic traveling over the protection capacity instead of the traffic traveling over the working capacity.

The standards define two different types of MS-SPRING protection mechanisms: the classic algorithm and the transoceanic one, the latter being especially fit for circular networks involving distances between nodes on the order of thousands of kilometers. The two algorithms allow the achievement of the same result in terms of traffic protection, still utilizing different rerouting methods.

With specific reference to the mechanism according to the present invention, it is characterized by the following variables: i) network architecture, ii) configuration data of the network elements; iii) mechanism triggering criteria; iv) mechanism state machine with corresponding transient rules for passing from a state to another state and information exchange protocol (syntax and semantics); v) traffic rerouting method; and vi) set of operator commands for maintenance. The solution to the WDM network protection problem therefore consists in the definition of such variables.

As far as the network architecture (variable i) is concerned, the present invention relates to a traffic protection method in WDM-based fiber optic telecommunications networks comprising nodes joined by spans. The information traffic protection on said telecommunications networks is performed through the definition of a number of working channels and a number of spare channels which are used for protecting the traffic which is normally carried on a working channel, and traffic switching operations between said working channel and protection channel, said switching operations being controlled by protection words exchanged between the nodes of said telecommunications network.

In WDM networks, each fiber pair houses a bi-directional Optical Multiplex Section (OMS) which in turn contains a number M of Optical Channels (OCs) each at a different wavelength and which is able to transport STM-N SDH frames. For a better understanding of what said above, see FIG. 1.

In WDM networks two network topologies are defined:
two-fiber rings, namely each node of the ring is connected to another node by a span consisting of two optical fibers, which carry signals propagating relative to one another in opposite directions (hence, a sole OMS section); on each fiber, a portion of the OCs is used as working capacity, the rest as protection capacity;
four-fiber rings, namely each node of the ring is connected to another node by two bi-directional spans of two optical fibers each, (hence, two OMS sections); a bi-directional fiber pair is entirely used as working capacity (OMS-W), the other fiber pair is used as protection (or spare) capacity (OMS-S).

As far as the mechanism triggering criteria (variable iii), the state machine and the protocol (variable iv), and the set of operator maintenance commands (variable vi) are concerned reference could be made to mechanisms which have been already standardized, thus which operate correctly, and which can be properly used in this domain: the proposed solution for the OTN networks is similar to the MS-SPRING mechanisms already known and standardized for the SDH synchronous transmission which are set forth in the aforesaid ITU-T Recommendation G.841. In particular, let the triggering criteria be the defects at OMS section level or the node failures, the state machine and the protocol be the one described in the ITU-T Recommendation G.841, October 1998, sections 7.2.3, 7.2.5 and 7.2.6, and the commands be those described in the ITU-T Recommendation G.841, October 1998, section 7.2.4, where all the terms and concepts peculiar to the SDH transmission are replaced by the corresponding ones peculiar to OTN networks. Such a replacement is anyway believed to be within the common knowledge of a person skilled in the art. Such a replacement for instance relates to K1 and K2 bytes which are the SDH hoverhead bytes used for transporting the above mentioned protocol and should be replaced by the terms through which corresponding structures for the optical network supervision system can be defined. A further similarity for instance relates to the alarms which contribute to the detection of protection mechanism triggering criteria—Signal Fail and Signal Degrade, which in OTN can be different from the various LOS, LOF, MS-AIS, EXBER, well known in the SDH domain.

The present invention contemplates the use of protection mechanisms similar to the protection mechanisms used in the MS-SPRINGs as far as both the network architecture, the mechanism triggering criteria, the information exchange protocol and the operator commands are concerned, but which differ as to traffic rerouting method and data for configuring the network elements.

Consider the following definitions:
Path: logical route connecting two or more network elements of the SDH ring. It is characterized by the serial number of the SDH channel used and by the direction. Generally, a ring carrying STM-N signals is able to carry paths at STM-1 bit rates.
Optical Path: logical route connecting two or more network elements of the WDM ring. It is characterized by the OC channel or wavelength (λ) utilized, by the direction and by the bit rate, namely the number of bits transmitted in the time unit. Every optical path can be used to connect network elements through an STM-N "tube", which in turn is able to carry a number of SDH paths.

Figure 2A:
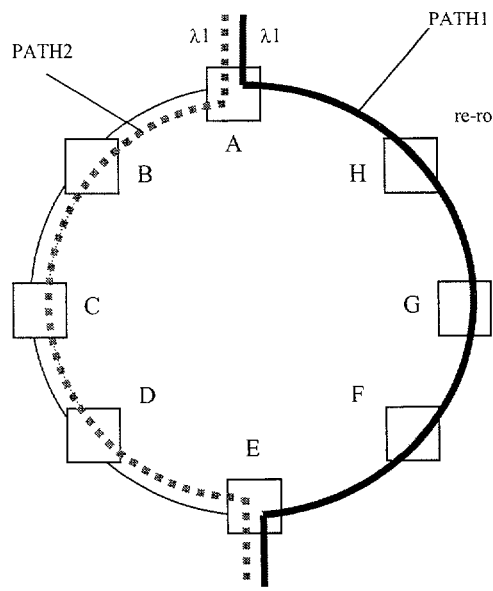
FIG. 2a schematically shows a ring-topology optical transport network in a fault free condition.
Figure 2B:
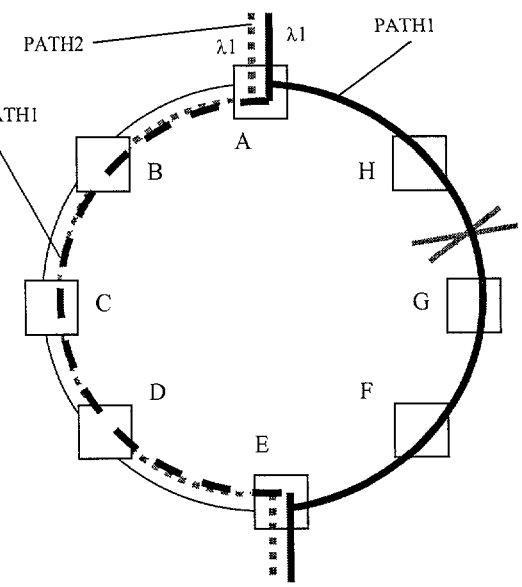
FIG. 2b shows the same network of FIG. 2a in a transoceanic configuration which is affected by a ring failure and also shows the corresponding action of the protection mechanism.
Figure 2C:
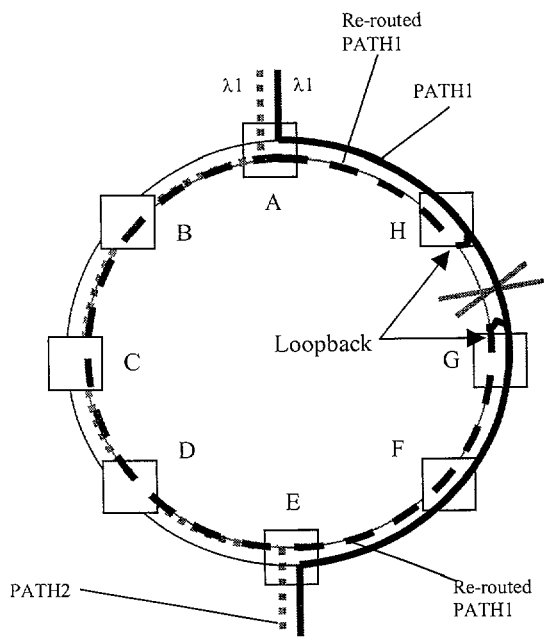
FIG. 2c shows the same network of FIG. 2a in a "terrestrial" or "classic" configuration which is affected by a ring failure and also shows the corresponding action of the protection mechanism.
Figure 2D:
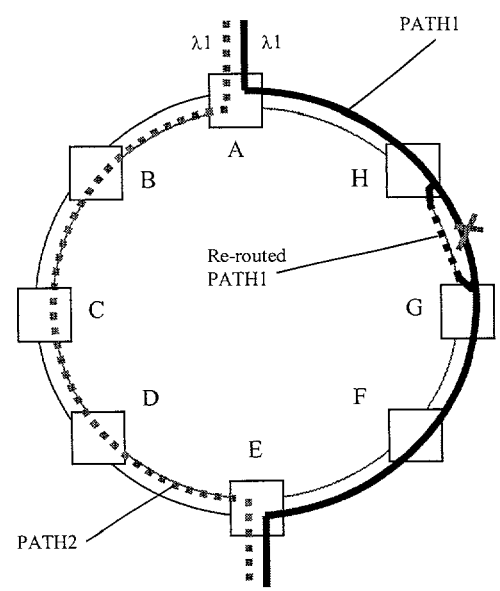
FIG. 2d shows the same network of FIG. 2a which is affected by a span failure.

As far as the traffic rerouting method is concerned, the proposed solution for the OTN networks provides for the same mechanisms, termed Classic and Transoceanic, defined for SDH transmission, where (with reference to FIGS. 2a and 2b):
in the Classic or Terrestrial rings (ITU-T G.841 October 1998, section 7.2.3) the Bridge and Switch is performed by the nodes which are adjacent to the failure/command (nodes H and G of FIGS. 2c and 2d):
in the event of span failure/command, by restoring at OMS level the traffic, normally carried on the working channel, on the corresponding protection channel of the same span,
in the event of ring failure, by restoring, at OMS section level, the traffic, normally carried on the working channel on the protection channel through loopback (FIG. 2c);
in the Transoceanic rings (ITU-T G.841 October 1998, Annex A) the bridge and Switch operation is performed (FIG. 3b):
in the event of span failure/command, optical path-by-optical path, by the nodes adjacent to the failure/command which restore the traffic, normally carried on the working channel, on the corresponding protection channel of the same span (FIG. 2d);

in the event of ring failure/command, optical path-by-optical path, by the path add/drop nodes through rerouting over the semi-ring that does not include the failed span.

In the various figures, the protected path (PATH1) is indicated by a continuous bold line; the spare path (PATH2) is indicated by a short-dash bold line; the re-routed path is indicated by a longer-dash bold line; the working fiber is indicated by the thin external circular line and finally the spare fiber is indicated by the thin internal circular line.

In addition to the above, the re-routing step according to the present invention comprises a network element re-programming step which is "dynamic", namely it is carried out according to the bit rate, as it will become clear below.

Consider now the definition of the node configuration modes. In this sense, to face the peculiarities of the WDM-based networks, which by their very nature allow for the transport of signals at different bit rates on the various wavelengths, it is necessary to provide the network elements with special information during the preliminary configuration of the protection mechanism.

For example, lets consider a WDM ring that is protected by means of a mechanism similar to that of the transoceanic MS-SPRINGs as depicted in FIG. 2b. A protected optical path (PATH1) and a low-priority path (PATH2) connect the same node pair A and E and are allocated on the same wavelength $\lambda 1$, in the working and protection capacities, respectively, but follow different routes. Further, lets assume that the protected optical path PATH1, carries a 2.5 Gbit/s signal. In the event of a failure causing interruption of a span crossed by the protected optical path, the two termination nodes of the channel itself perform the Bridge and Switch operation to reroute the signal over the alternate route, utilizing the same $\lambda 1$ on protection capacity. Hence, it is necessary to drop (i.e. let fall) the low-priority optical path to make $\lambda 1$ available for transporting the protected optical path, similarly to what could be done for a path in SDH.

In addition to the above operations, it is necessary for the nodes A, B, C, D and E, that normally carry the 2.5 Gbit/s low-priority optical path on the wavelength $\lambda 1$ to be reconfigured in terms of bit rate so as to enable them to transport a 10 Gbit/s signal of the protected optical path on the same $\lambda 1$.

Therefore, in order to carry out the protection mechanism for a WDM ring, it is necessary to provide each network element with information such as the ring map and the characteristics of the optical channels, as well as the bit rate of every optical path, so that every node knows at which bit rate each wavelength is to be configured according to the rerouting activity.

Turning back to the example of FIG. 2b, the information with which every network element is to be provided is the following:

1) the ring map, namely the serial sequence of the identifiers of the network elements forming the ring. In this case it is [A, B, C, D, E, F, G, H];
2) the traffic map: the path characteristics i.e.
   2.1) the identifiers of the nodes which are connected to each other through a path:
   PATH1=[A, H, G, F, E]
   PATH2=[A, B, C, D, E]
   2.2) the channel which is utilized by each path
   PATH1=[$\lambda 1$], on working capacity;
   PATH2=[$\lambda 1$], on protection capacity
   2.3) the direction of each path
   PATH1=bi-directional
   PATH2=bi-directional In case of, e.g., a ring failure causing full interruption of a span like that between H and G in FIG. 2a crossed by the protected optical path PATH1, the two termination nodes A and E of PATH1 perform the Bridge and Switch operation to reroute the signal over the alternate route, using the same $\lambda 1$ on the protection capacity, similarly to what could be done for a path in SDH. Therefore, nodes B, C and D which in a failure free state carried PATH2 on the protection capacity wavelength $\lambda 1$, now have to carry PATH1 over both the same $\lambda$ and capacity, PATH1 having a higher priority than PATH2. The connections within said nodes, allowing for the path transportation, should not be changed, being still pass-through connections that make the signal to pass from one side through the other side of the node, but the internal circuits are to be re-programmed to enable them to carry a 10 Gbit/s signal (PATH1) instead of the 2.5 Gbit/s one (PATH2).

The nodes B, C and D thus must be aware that PATH1 operates at 10 Gbit/s. Therefore, the information described previously, which every network element is to be provided with, must be enriched with a new datum;
3) the bit rate:
PATH1=[10 Gbit/s]
PATH2=[2.5 Gbit/s]

These considerations quite generally apply to classic and transoceanic WDM rings as regards to the span failures as well as to the ring ones.

Figure 3:
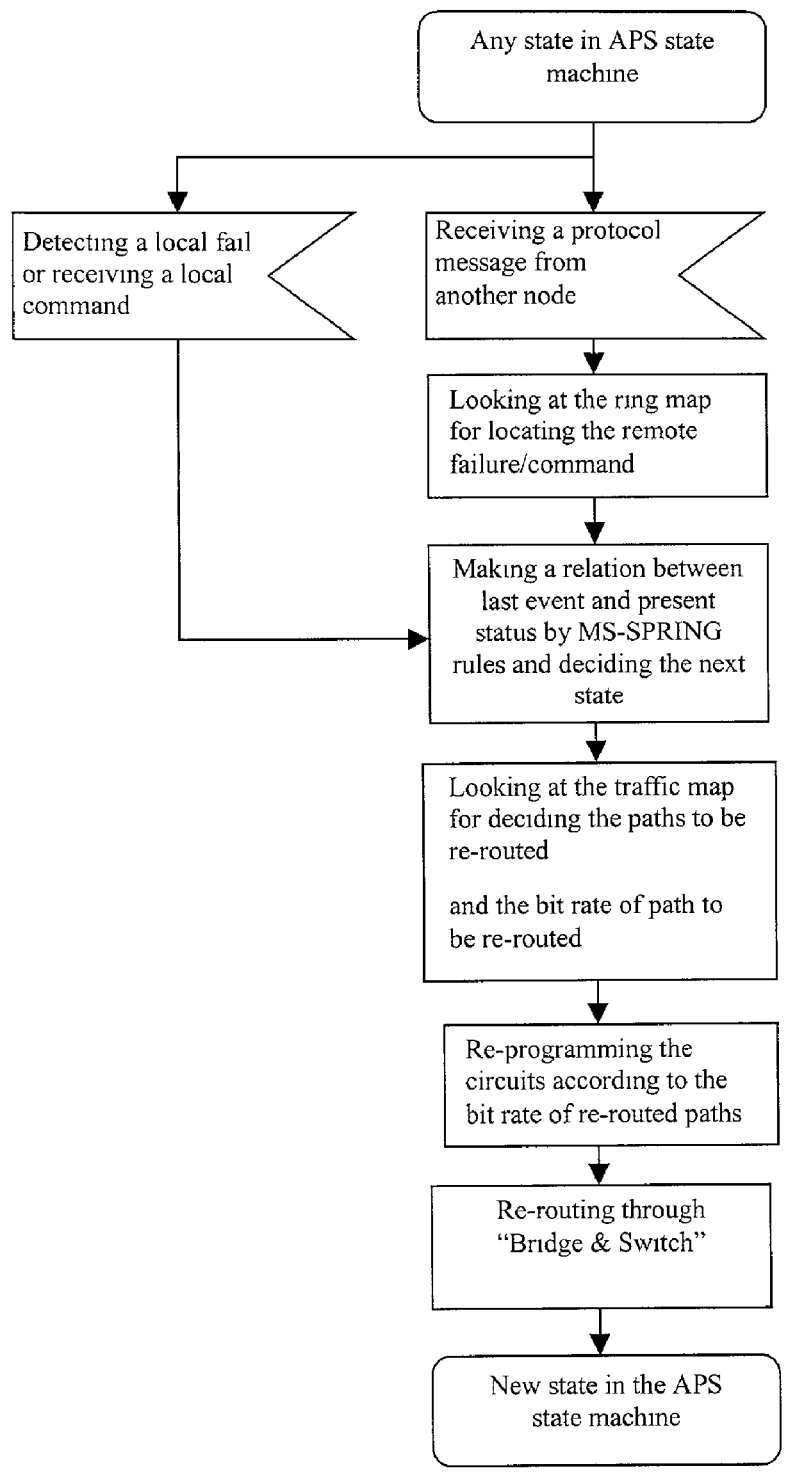
FIG. 3 is a block diagram of some steps of the method according to the invention.

The logic of a generic APS controller for the protection mechanism according to the invention is represented in FIG. 3.

Starting from any state in the APS state machine, a node that receives a protocol message from another node, in a first instance reads the ring map to locate the failure (or the command) which resulted in the message issue. Afterwards it makes a relation between the last event and the current state by means of the above rules and decides the next state. Then it consults the traffic map to understand which paths are to be rerouted and the bit rate of the paths to be rerouted. Then it performs the rerouting through Bridge & Switch and goes to the new state machine.

Obviously, should the network element detect a failure or a local and no longer remote command from another network element, it will be not necessary to consult the ring map to locate the failure (the event).

There have thus been shown and described a novel method and a novel network element which fulfill all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for protecting traffic in a WDM-based ring-topology optical transport network, said network comprising network elements joined by spans, optical paths being defined between said network elements, the method comprising the steps of:
    i) defining a network architecture;
    ii) defining configuration data of the network elements;
    iii) defining criteria triggering the protection mechanism;
    iv) defining a mechanism state machine and a protocol for exchanging information between the network elements, the protocol comprising a set of messages and both the syntax and semantics thereof;

v) defining a method for traffic re-routing; and vi) defining a set of operator commands for network maintenance, wherein said step i) comprises the step of defining a network wherein the whole capacity is evenly split between working capacity and protection capacity; said step ii) comprises the steps of providing each network element with a ring network map, a traffic map with path characteristics and bit rate of each path; said step iii) comprises the step of considering as triggering criteria the defects at OMS section level or the network element failures; said step iv) comprises the step of defining as state machine and protocol fundamentally those described in ITU-T G.841; and said step vi) comprises the step of defining as operator commands those described in ITU-T G.841, wherein the terms and concepts which are specific for SDH transmissions are replaced by those corresponding to OTN networks.

2. A method according to claim 1, wherein said step v) comprises the step, carried out by the network elements which are adjacent to a failure/command, of performing a Bridge & Switch so that the traffic is restored at Optical Multiplex Section level and in case of a span failure/command in the ring network, traffic normally traveling on the working channel will be transported on the corresponding spare channel of the same span;

in case of a ring failure/command in the ring network, traffic normally traveling on the working channel will be transported on the corresponding spare channel through a loopback.

3. A method according to claim 1, wherein said step v), in case of a span failure/command in the ring network, the network elements which are adjacent to a failure/command carry out, optical path-by-optical path, a Bridge & Switch so that traffic normally traveling on the working channel will be transported on the corresponding spare channel of the same span;

in case of a ring failure/command in the ring network, the path insert/drop network elements carry out a Bridge & Switch by re-routing on the semi-ring network which does not comprises the failed span.

4. A method according to claim 1, wherein said step of providing each network element with a traffic map comprises the step of providing the network elements with information comprising identifiers of network elements which are in communication with each other, the channel which is used by each path and the path direction.

5. A programmed computer program executing computer program code means adapted to perform all the steps of claim 1 when said program is executed by said computer.

6. A computer-readable medium having a program recorded thereon, said computer-readable medium comprising computer program code means adapted to perform all the steps of claim 1 when said program is run on a computer.

7. A network element to be used in an optical fiber transport network having a ring topology and WDM technology based, said network comprising network elements joined by spans, optical path being installed between said network elements, said network element comprising:

i) means for receiving/storing network architecture information of a network wherein the whole capacity is evenly split between working capacity and protection capacity;

ii) means for receiving/storing configuration data of the network element, said configuration data including for each network element a ring network map, a traffic map with path characteristics and bit rate of each path;

iii) means for receiving/storing criteria triggering the protection mechanism, said triggering criteria including the defects at OMS section level or the network element failures;

iv) a mechanism state machine and means for receiving/storing a protocol for exchanging information between the network elements, said mechanism state machine and protocol being compliant with ITU-T G.481, and said protocol comprising a set of messages and both the syntax and semantics thereof;

v) means for receiving/storing a method for traffic re-routing, said method comprising the step of defining as operator commands those described in ITU-T G.841, wherein the terms and concepts which are specific for SDH transmissions are replaced by those corresponding to OTN networks; and vi) means for receiving/storing a set of operator commands for network maintenance.

* * * * *